United States Patent Office 3,235,456
Patented Feb. 15, 1966

3,235,456
N-(TRIMETHYLACETYL) ANILINES
Michel Leon Thominet and Claude Marcel Laville, Paris, France, assignors to Société d'Etudes Scientifiques et Industrielles de l'Ile-de-France, a society of France
No Drawing. Filed Mar. 19, 1965, Ser. No. 441,380
Claims priority, application France, Oct. 18, 1961, 876,357
35 Claims. (Cl. 167—65)

This application is a continuation-in-part of the copending patent applications of M. L. Thominet et al., Ser. Nos. 230,689 and 230,690, both filed October 15, 1962, both now abandoned.

This invention relates to N-(trimethylacetyl) anilines and to methods of treating pain, fever and inflammation in mammals by administering to them an N-(trimethylacetyl) aniline.

In accordance with one aspect of this invention, certain new N-(trimethylacetyl) anilines have been discovered which are useful as analgesics. Many of them, while significantly effective as analgesics, have markedly lower acute toxicities than known analgesics. For example, in a test conducted, N-(trimethylacetyl)-p-ethoxyaniline had an $LD_{50}$ when administered by mouth to mice of the order of 7 g. per kilogram of body weight, as contrasted with and $LD_{50}$ of 1.32 g. per kilogram of body weight for aspirin tested under the same conditions; in short, over 5 times the dosage of N-(trimethylacetyl)-p-ethoxyaniline was required to produce the same toxicity as aspirin. Yet, the analgesic $dose_{50}$ by mouth found in the testing of mice, in accordance with the technique of Siegmund, Cadmus and Lu, was 98 for the N-(trimethylacetyl)-p-ethoxyaniline, as contrasted with an analgesic $dose_{50}$ of 122 mg./kg. for aspirin.

The new N-(trimethylacetyl) anilines of this invention have the formula:

(1)

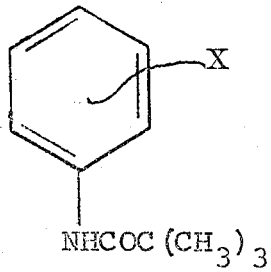

in which X is the hydroxy radical or a lower alkoxy group. Examples of lower alkoxy groups are: the methoxy, the ethoxy, the propyloxy and isopropyloxy groups.

In accordance with another aspect of this invention, pain, fever and inflammation may be treated by administering to a mammal an N-(trimethylacetyl) aniline having the formula:

(2)

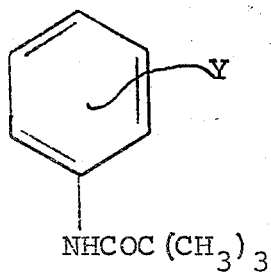

in which Y is hydrogen, the hydroxy radical, a lower alkoxy group or the trimethylacetylamino group. Examples of lower alkoxy groups are: the methoxy, the ethoxy, the propyloxy and the isopropyloxy groups.

For many applications, the N-(trimethylacetyl) anilines are associated with solid or liquid pharmaceutically acceptable carriers for oral or parenteral administration in the treatment of pain, fever and inflammation.

All N-(trimethylacetyl) anilines are prepared by reacting the corresponding aniline with an acylating agent, such as trimethylacetyl anhydride or a trimethylacetyl halide, such as trimethylacetyl chloride.

A more comprehensive understanding of this invention is obtained by reference to the following examples:

EXAMPLE 1

N-(trimethylacetyl)-p-aminophenol

To 40 g. (0.75 mol) of trimethylacetyl chloride is added at a temperature between 0 and 5° C., a solution of 82 g. (0.75 mol) of p-aminophenol in 270 cc. of pyridine under an atmosphere of nitrogen. The solution obtained after reaction is diluted and acidified. The crystallized product is dried, washed with water until neutral, and is dissolved in diluted soda. The solution is bleached with sodium bisulfite, the material reprecipitated by means of hydrochloric acid, and recrystallized in alcohol at 95°. There are obtained 79 grams of product. The N-(trimethylacetyl)-p-aminophenol produced is a new compound. It is white and has a melting point of 168° C. in a yield of 53%.

EXAMPLE 2

N-(trimethylacetyl)-p-methoxyaniline

Using the same procedure as in the preceding example and employing 92 g. (0.75 mol) of p-methoxyaniline and 92.5 g. (0.76 mol) of trimethylacetyl chloride, there are obtained 113 g. of the new compound, N-(trimethylacetyl)-p-methoxyaniline [also called N-(trimethylacetyl)-p-anisidine], having a melting point of 130° C. in a yield of 73%.

EXAMPLE 3

N-(trimethylacetyl)-p-ethoxyaniline

When using the same procedure of Example 2 and employing 103 g. (0.75 mol) of freshly distilled p-ethoxyaniline, also known as p-phenetidine, and 92.5 g. (0.76 mol) of trimethylacetyl chloride, there are obtained 126 g. of the new compound, N-(trimethylacetyl)-p-ethoxyaniline [also called N-(trimethylacetyl)-p-phenetidine], having a melting point of 106° C. in a yield of 76%.

EXAMPLE 4

N-(trimethylacetyl)-p-propyloxyaniline

To 86 g. (0.71 mol) of trimethylacetyl chloride are added, between 0 and 10° C., a solution of 106 g. (0.70 mol) of p-propyl-oxyaniline in 320 cc. of pyridine. After a period of one hour, 300 cc. of water are added. The product precipitates, and more water is added to bring to 2.900 liters. The product is allowed to stand, is dried, and washed until the chloride ions are eliminated. There are obtained 130 g. of the new compound, N-(trimethylacetyl)-p-propyloxyaniline, having a melting point of 93° C. in a yield of 79%.

EXAMPLE 5

N-(trimethylacetyl)-p-isopropyloxyaniline

To 103 g. (0.835 mol) of trimethylacetyl chloride is added between 0 and 10° C. a solution of 126 g. (0.835 mol) of p-isopropyloxyaniline in 378 cc. of pyridine.

After allowing the reaction mixture to stand for one hour, 300 cc. of water are added, the product precipitates, is decanted in 3.500 liters of cold water, dried, and washed until the chloride ions disappear.

There are obtained 142 g. of the new compound, N-(trimethylacetyl)-p-isopropyloxyaniline, having a melting point of 112° C. in a yield of 72.5%.

EXAMPLE 6

N-(trimethylacetyl)-o-methoxyaniline 101 g. (0.82 mol) of trimethylacetyl chloride are added between 0 and 10° C. to 101 g. (0.82 mol) of o-methoxyaniline, also known as o-anisidine, dissolved in 303 cc. of pyridine. After the reaction mixture is allowed to stand for one hour, it is heated one hour at 40° C., left to stand one-half hour, and diluted to 3 liters with water. The product precipitates. It is extracted twice with methylene chloride. The solvent is washed with 5% hydrochloric acid to remove the unreacted amine, then twice with a 10% aqueous solutions of sodium carbonate. The solvent is dried and distilled under vacuum. There are obtained 127 g. of solid new compound, N-(trimethylacetyl)-o-methoxyaniline [also called N-(trimethylacetyl)-o-anisidine] having a melting point of 41° C. in a yield of 75%.

EXAMPLE 7

Bis-N,N'-(trimethylacetyl)-o-phenylenediamine

To 41 g. (0.34 mol) of trimethylacetyl chloride are added between 0 and 10° C., 19 g. (10.17 mol) of o-phenylenediamine in 120 cc. of pyridine. The reaction mixture is allowed to stand for one hour. 1200 cc. of water are added, the substance precipitates, is dried, and washed until the chloride ions disappear. There are obtained 41 g. of product having a melting point of 180° C. in a yield of 87%. This compound is useful in the treatment of pain, fever and inflammation in mammals.

EXAMPLE 8

Bis-N,N'-(trimethylacetyl)-p-phenylenediamine

To 66 g. (0.55 mol) of trimethylacetyl chloride are added, drop by drop, between 0 and 10° C., 30 g. (0.28 mol) of p-phenylenediamine dissolved in 210 cc. of pyridine. It is allowed to stand for one-half hour, 350 cc. of water are added and water is then added to make 2.100 liters. The precipitated product is dried, washed with water until the chloride ions disappear, then dried. There are obtained 60 g. of product having a melting point of 287° C. in a yield of 79%. This compound is useful in the treatment of pain, fever and inflammation in mammals.

EXAMPLE 9

N-(trimethylacetyl) aniline

To a solution of 50 g. of aniline (0.54 mol) in 210 cc. of pyridine, is added, little by little, while stirring and maintaining the temperature, between 0 and 10° C., 66 g. (0.55 mol) of trimethylacetyl chloride. The period of time of introduction is about ¾ of an hour. The stirring is continued during another ¼ hour allowing the temperature to climb toward 20° C.

The reaction mixture is diluted in 2.100 cc. of water. The product, which crystallizes, is then dried and washed in water until it is neutral. The product is recrystallized in 250 cc. of alcohol at 60°. There were obtained 82 g. of product having a melting point of 136° C. and a yield of 86%. This compound is also useful in the treatment of pain, fever and inflamation in mammals.

The N-(trimethylacetyl) anilines of Formula 2 above have especially low acute toxicity as indicated in the following table of the $LD_{50}$ values when administered to mice by mouth.

| Composition: | $LD_{50}$ mouse by mouth, g./kg. |
|---|---|
| N-(trimethylacetyl)aniline | >5 |
| N-(trimethylacetyl)-p-aminophenol | 2.2 |
| N-(trimethylacetyl)-p-methoxyaniline | >5 |
| N-(trimethylacetyl)-p-ethoxyaniline | 7 |
| N,N' - bis - (trimethylacetyl) - p - phenylenediamine | >5 |
| N-(trimethylacetyl)-p-propyloxyaniline | >5 |
| N-(trimethylacetyl)-p-isopropyloxyaniline | 0.96 |
| N-(trimethylacetyl-p-propyloxyaniline | >5 |

The results of similar $LD_{50}$ tests conducted with known analgesics are given in the following table:

| Composition: | $LD_{50}$ mouse by mouth, g./kg. |
|---|---|
| Aspirin | 1.32 |
| Acetanilide | 3.2 |
| N-acetyl-p-aminophenol | 5.56 |
| Phenacetine | 1.3 |

These two comparative tables show that the N-(trimethylacetyl) anilines are much less toxic than similar analgesics like aspirin, phenacetine or the N-acetyl-p-aminophenol.

The analgesic potency of the N-(trimethylacetyl) anilines was tested according to the technique of Siegmund, Cadmus and Lu (Proc. Soc. Exper. Biol., 1957, 96, 729); the test involves the use of 2-phenyl-1,4-benzoquinone.

The intraperitoneal injection of 0.25 cc. of a solution of 0.02% of 2-phenyl-1,4-benzoquinone causes a characteristic syndrome ("writhing syndrome") in the mouse at the end of 10 minutes and abdominal contractions, twisting of the body, and extension of the pawls, during a period of more than 60 minutes. These phenomena are supressed by the analgesics.

The comparison between a test lot and lots treated with different doses of analgesics permits the establishment of the percentage of protection in terms of the dose administered and the graphic calculation of the analgesic $dose_{50}$ for a given composition. The results of the analgesic $dose_{50}$ by mouth of the trimethylacetyl anilines are given in the following table:

| Composition tested: | Analgesic dose by mouth, mg./kg. |
|---|---|
| N-(trimethylacetyl) aniline | 520 |
| N-(trimethylacetyl)-p-aminophenol | 200 |
| N-(trimethylacetyl)-p-methoxyaniline | 160 |
| N-(trimethylacetyl)-p-ethoxyaniline | 98 |
| N-(trimethylacetyl)-p-propyloxyaniline | 250 |
| N-(trimethylacetyl)-p-isopropyloxyaniline | 55 |
| N-(trimethylacetyl)-o-methoxyaniline | 310 |

By way of comparison, the analgesic $dose_{50}$ by mouth of three known analgesics in mg./kg. is as follows:

| Composition: | Analgesic $dose_{50}$ by mouth, mg./kg. |
|---|---|
| Methacetine | 500 |
| N-acetyl-p-aminophenol | 420 |
| Aspirin | 122 |

The N-(trimethylacetyl) anilines, then, have a very effective analgesic action. Certain of them are superior to aspirin. They possess besides, effective anti-febrile and anti-inflammatory properties.

The pharmacological data have been confirmed in human therapy where interesting clinical results have been obtained.

For example, the N-(trimethylacetyl)-p-ethoxyaniline showed excellent digestive tolerance in doses varying between 6 and 8 g. daily (12 to 16 compressed tablets of 0.50 g. each) with a dose of 3 g. per day (6 compressed tablets of 0.50 g. each) to a patient hospitalized for an alcoholic polyneural condition, in the first steps of cirrhosis, and presenting a painful syndome of two lower members predominately in the calves, accompanied by a certain degree of incapacitation, quick relief of the pain was noted.

With the same substance given in the same way in a dose of 3 g. per day to a patient having a syndrome of painful thoracic difficulty linked to a right pleural discharge, a rapid stopping of the difficulty was observed. In both of these patients, the action of aspirin was incomplete.

The N-(trimethylacetyl)-p-isopropyloxyaniline was used on a patient stricken with pain in the diaphragm resisting known analgesics. The composition was administered in the form of tablets of 0.5 g. for a period of 5 days, 4 tablets each day (2 g.), and 6 tablets for the following eight days. The product is fast acting, causing marked diminution of pain 1 hours to 1½ hours after its administration.

Desirably, the N-(trimethylacetyl) anilines, such as those described in Examples 1 through 9 are associated with solid or liquid pharmaceutically acceptable carriers for oral or parenteral administration in the treatment of pain, fever or inflammation. The N-(trimethylacetyl) analines and carriers may be in the form of capsules, tablets, powders, sterile solutions of water or other solvents or other dosage forms. The N-(trimethylacetyl) anilines may be admixed with diluents and adjuvants, such as lactose, gums, stearic acid or talc. Conveniently, the N-(trimethylacetyl) anilines may be in conventional dosage forms.

The N-(trimethylacetyl) anilines may be administered under the form of:

(a) Sugared tablets of 0.5 g., 4 to 12 tablets per day;
(b) Suppositories of 1.5 g., 2 to 4 per day;
(c) Granulated saccharine for children at 250 mg. by measurement equivalent to one level coffee spoon (about 4 g.)

according to the prescription of the attending physician, the weak toxicities of these substances permitting the physician to administer the dosage according to the action sought.

What is claimed is:
1. A compound of the formula:

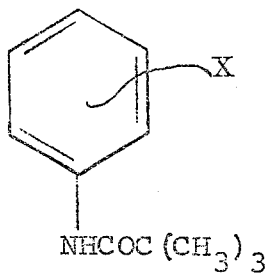

in which X is selected from the class consisting of hydroxy and lower alkoxy.

2. N-(trimethylacetyl) lower alkoxy aniline.
3. N-(trimethylacetyl)-p-ethoxyaniline.
4. N-(trimethylacetyl)-p-methoxyaniline.
5. N-(trimethylacetyl)-o-methoxyaniline.
6. N-(trimethylacetyl)-p-aminophenol.
7. N-(trimethylacetyl)-p-isopropyloxyaniline.
8. N-(trimethylacetyl)-p-propyloxyaniline.
9. The method of treating pain in mammals which comprises administering to a mammal afflicted with pain, a non-toxic but effective amount of a compound having the formula:

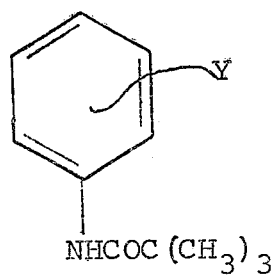

in which Y is a member selected from the group consisting of hydrogen, hydroxy, lower alkoxy and trimethylacetylamino.

10. The method of treating pain in accordance with claim 9 in which said compound is N-(trimethylacetyl) lower alkoxy aniline.
11. The method of treating pain in accordance with claim 9 in which said compound is N-(trimethylacetyl) aniline.
12. The method of treating pain in accordance with claim 9 in which said compound is N-(trimethylacetyl) methoxyaniline.
13. The method of treating pain in accordance with claims 9 in which said compound is N-(trimethylacetyl)-p-ethoxyaniline.
14. The method of treating pain in accordance with claim 9 in which said compound is N-(trimethylacetyl)-o-methoxyaniline.
15. The method of treating pain in accordance with claim 9 in which said compound is N-(trimethylacetyl)-p-isopropylaniline.
16. The method of treating pain in accordance with claim 9 in which said compound is N-(trimethylacetyl)-p-methoxyaniline.
17. The method of treating pain in accordance with claim 9 in which said compound is N,N'-bis-(trimethylacetyl)phenylenediamine.
18. The method of treating fever in mammals which comprises administering to a mammal afflicted with fever a non-toxic but effective amount of a compound having the formula:

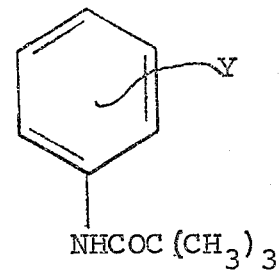

in which Y is a member selected from the group consisting of hydrogen, hydroxy, lower alkoxy and trimethylacetylamino.

19. The method of treating fever in accordance with claim 18 in which said compound is N-(trimethylacetyl) lower alkoxy aniline.
20. The method of treating fever in accordance with claim 18 in which said compound is N-(trimethylacetyl) aniline.
21. The method of treating fever in accordance with claim 18 in which said compound is N-(trimethylacetyl)-methoxyaniline.
22. The method of treating fever in accordance with claim 18 in which said compound is N-(trimethylacetyl)-p-ethoxyaniline.
23. The method of treating fever in accordance with claim 18 in which said compound is N-(trimethylacetyl)-o-methoxyaniline.

24. The method of treating fever in accordance with claim 18 in which said compound is N-(trimethylacetyl)-p-isopropylaniline.

25. The method of treating fever in accordance with claim 18 in which said compound is N-(trimethylacetyl)-p-methoxyaniline.

26. The method of treating faver in accordance with claim 18 in which said compound is N,N'-bis-(trimethylacetyl)-phenylenediamine.

27. The method of treating inflammation in mammals which comprises administering to a mammal afflicted with inflammation a non-toxic but effective amount of a compound having the formula:

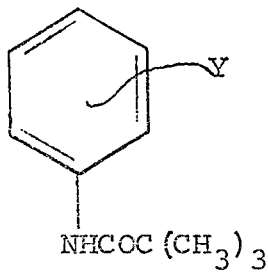

in which Y is a member selected from the group consisting of hydrogen, hydroxy, lower alkoxy and trimethylacetylamino.

28. The method of treating inflammation in accordance with claim 27 in which said compound is N-(trimethylacetyl) lower alkoxy aniline.

29. The method of treating inflammation in accordance with claim 27 in which said compound is N-(trimethylacetyl) aniline.

30. The method of treating inflammation in accordance with claim 27 in which said compound is N-(trimethylacetyl) methoxyaniline.

31. The method of treating inflammation in accordance with claim 27 in which said compound is N-(trimethylacetyl)-p-ethoxyaniline.

32. The method of treating inflammation in accordance with claim 27 in which said compound is N-(trimethylacetyl)-o-methoxyaniline.

33. The method of treating inflammation in accordance with claim 27 in which said compound is N-(trimethylacetyl)-p-isopropylaniline.

34. The method of treating inflamation in accordance with claim 27 in which said compound is N-(trimethylacetyl)-p-methoxyaniline.

35. The method of treating inflammation in accordance with claim 27 in which said compound is N,N'-bis-(trimethylacetyl)phenylenediamine.

References Cited by the Examiner
UNITED STATES PATENTS
2,402,792   6/1946   Watson et al. _____ 260—561 X OTHER REFERENCES
Degnan et al.: Journ. Am. Chem. Soc., vol. 68, pp. 104–5 (1946).

JULIAN S. LEVITT, *Primary Examiner.*

UNITED STATES PATENT OFFICE

CERTIFICATE OF CORRECTION

Patent No. 3,235,456                                    February 15, 1966

Michel Leon Thominet et al.

It is hereby certified that error appears in the above numbered patent requiring correction and that the said Letters Patent should read as corrected below.

Column 2, line 58, for "p-propyl-oxyaniline" read -- p-propyloxyaniline --; column 3, line 32, for "10.17" read -- 0.17 --; line 74, for "2" read -- (2) --; column 4, line 20, for "5.56" read -- 0.56 --; line 30, for "96", in bold type, read -- 96 --, in italics.

Signed and sealed this 7th day of February 1967.

SEAL)

Attest:

ERNEST W. SWIDER
Attesting Officer

EDWARD J. BRENNER
Commissioner of Patents